UNITED STATES PATENT OFFICE 2,029,261

SOYBEAN PHOSPHATIDES

Wells W. Ginn, Cincinnati, Ohio, assignor to Chemical Novelties Corporation, Cincinnati, Ohio, a corporation of Ohio No Drawing. Application January 30, 1935, Serial No. 4,147

9 Claims. (Cl. 260—99.20)

This invention relates to a new product which is derived from soybeans. The invention likewise relates to a method or process for obtaining this material and similar or analogous soybean products.

The strict chemical composition of the material which is the subject matter of this invention has not been determined so that it must necessarily be defined in relation to its source and to the method employed in obtaining it. Its complexity is similar to the complexity of materials such as the mixed glycerides composing the parent soybean oil. It has been determined that this product is of the phosphatide type or group and most probably comprises a number of the members of the phosphatide series, the relative proportions probably varying with the specie, age and geographic source of the soybeans employed as raw material, just as the mixed glycerides of the soybean oil vary in constituency in relation to the specie, age and geographic source of the raw material. For the purpose of this disclosure, the product of this invention will therefore be referred to as soybean phosphatides.

In the past it has been conventional to procure soybean phosphatides, such as lecithin, by extracting bean meal with solvents such as alcohol. During the last ten years such materials have been imported from abroad and have been offered on the American market. The prices have ranged from seventy-five cents to a dollar and a quarter a pound. Of late years, soybeans have been produced in greater quantities in this country and have been pressed in a large number of local mills in order to obtain soybean oil suitable for soap making and for the paint and varnish industry. The oil obtained by the pressing of the beans has been cloudy and it has been conventional to store the oil for a period of from several weeks to several months to permit the cloudiness to settle out of it so that two layers were formed, the clear oil and the soybean sludge. The latter has always been dumped down the sewers or burned.

I have discovered that this soybean sludge comprises to a major extent the soybean phosphatides which, when sufficiently separated from the oily ingredient of the sludge, are as suitable for the market as the high-priced imported lecithin. These mixed phosphatides contain members which are not readily soluble in ethyl alcohol and in this respect my new product is distinguishable from and for many purposes superior to lecithin. To my knowledge, the material has been and is being successfully employed for many of the industrial and commercial uses to which lecithin is put.

My method of converting this soybean sludge into a commercial product is to first of all remove a substantial proportion of the soybean oil occurring in the sludge. After the oil removal, the product tends to become very hard physically and is therefore difficult to handle. To remedy this I cut it back with a fatty material, such as cocoa butter or other fat which is compatible with the use to which the phosphatide is to be put. Of course, it is possible and may in some cases be desirable either to leave a small percentage of bean oil in the phosphatides or to use them in their hard condition without the incorporation of a viscosity reducer. For most of the purposes, however, for which the phosphatides are at present used, the specified procedure is recommended.

The separation of soybean oil and soybean phosphatides is a very difficult, complex matter. A portion of the phosphatides is soluble in the soybean oil, particularly at elevated temperatures, such as the temperature used for pressing bean cake. The oil soluble or oil miscible portion of the phosphatides is substantially indistinguishable from the pressed bean oil and this factor is largely responsible for the presence of the phosphatides in the oil. When the bean oil is cooled down to room temperature, some of the phosphatides come out of solution and solidify or partially solidify to a floc and in this state float about in the bean oil in the form of semi-solid particles in which state the soybean oil is cloudy. These particles are so fine and so compatible with the bean oil that they cannot be removed by any commercial filtration method. The particles clog the filtering media, and if the filtering pressure is increased, the particles are pushed through the media. Likewise, these particles seem to have a specific gravity sufficiently close to the oil so that they settle extremely slowly, complete separation often requiring weeks or months. Acceleration of the specific gravity separation by centrifuging does not yield satisfactory results.

While it is conventional experience that it is easier to separate a solid and a liquid than it is to separate two liquids, I have discovered and determined that soybean phosphatides may be best separated from soybean oil in liquid phase. The melting point of these phosphatides and oil is not constant but in general tends to run from approximately 35 to approximately 50° C. From this temperature range up to approximately 70° C. the phosphatides are in liquid condition yet not dissolved in the oil.

The method aspect of this invention comprises gravity separating the soybean phosphatides from the bean oil while both components are in liquid phase. Gravity separation, as the term is used, is intended to include settling or centrifugal separation. The liquid condition of the suspended particles of the phosphatides permits and/or causes the particles to amalgamate or agglomerate into larger particles and globules which are more responsive to the force tending to effect the separation. Also, this temperature provides a viscosity of the bean oil which is conducive to the separation. This liquid phase separation may be used to accelerate the disappearance of cloudiness from the pressed bean oil, to obtain relatively pure phosphatides from the bean oil sludge, or to remove entrained bean oil from phosphatides which have been produced by chemical extraction from the bean meal. The latter phosphatides are not comprehended within my product invention inasmuch as there is chemical difference between them and the phosphatides of my invention, and moreover, they have long been produced by the extraction process. However, since the solvent used in that process is of such a nature as to extract some oil with the phosphatides and it is desirable to have a purer product, then my liquid phase separation is applicable for accomplishing the purification.

The following example will be of assistance to the skilled in the art in understanding how my new soybean phosphatide product is produced by my preferred separation method.

Fresh, hot pressed soybean oil is maintained in storage at a temperature slightly above the melting point of the phosphatides for a period of thirty-six hours or less or according to the length of the container, said separation preferably occurring at the rate of approximately one inch per hour, until a supernatant layer of clear bean oil appears. The sludge is then removed and is preferably blown with air at a temperature of 60 to 70° C. to eliminate any odors which may have been carried over from the bean cake or may have been formed as a result of decomposition in the pressing process. The material is then passed through a fine mesh screen to remove dirt or any particles of the bean cake which may have been carried over from the pressing operation. Next, the mass is heated to a liquid phase temperature, such as 60° C. and permitted further to stratify by gravity separation. This step is quite important if the temperature control of the initial separation has not been carefully observed or if the initial separation has been arrested at an intermediate point. Since the settling is usually done in the mills, and since much sludge is available which separated out at ordinary temperatures, this step is desirable unless the initial separation has removed all save about 10% bean oil.

Next, the material is subjected to a liquid phase separation in a centrifuge. A batch type centrifuge may be employed in which case the mixture is put in, an initial separation of phosphatides and oil effected, the oil removed, additional mixture put in, and so on until the centrifuge is substantially loaded with the phosphatides which are relatively free from the bean oil. The liquid phase aspect of the separation very much facilitates it in that the liquids flow more readily in response to the centrifugal force than would a mixture predominantly solid containing a small quantity of liquid. As the centrifuging is then continued, the phosphatides are permitted to cool and the small quantities of oil appearing periodically toward the center of the centrifuge are removed by wiping or other mechanical means.

The phosphatides are of a viscous, semi-solid, waxy consistency when removed from the centrifuge, the fluidity thereof being dependent upon the temperature. These phosphatides harden over a period of from a few hours to a few days into a gummy mass which is extremely difficult to handle and especially to redissolve. It is my practice to cut the phosphatides with liquefied cocoa butter immediately after removal from the centrifuge as at that stage they are sufficiently fluid for a thorough mixture to be accomplished. Usually substantially 5 to 10% cocoa butter or some similar fat or oil is suitable to reduce the melting point viscosity without adversely affecting the desired properties of the product. The phosphatides are then suitable for sale for many of the purposes for which lecithin is at present imported.

Having described my invention, I desire to be limited only by the ensuing claims:

1. A new method of obtaining soybean phosphatides which comprises, hot pressing the soybean oil and separating the phosphatides from the oil by virtue of the difference of specific gravity between the oil and the phosphatides.

2. A new method of obtaining soybean phosphatides which comprises, hot pressing the soybean oil and separating the phosphatides from the oil by virtue of the difference of specific gravity between the oil and the phosphatides when both constituents are in the liquid phase.

3. The method of separating soybean phosphatides and soybean oil, which comprises, effecting a liquid phase gravity separation without the use of foreign solvents.

4. A method of manufacturing soybean phosphatides, said method, comprising, hot pressing the soybeans to obtain soybean oil, separating the oil so pressed into clear oil and sludge, blowing the sludge with air to remove odor, filtering it to remove dirt, and further separating oil from said sludge by liquid phase centrifuging.

5. A method of manufacturing soybean phosphatides, said method, comprising, hot pressing the soybeans to obtain soybean oil, separating the oil so pressed into clear oil and sludge, blowing the sludge with air to remove odor, filtering it to remove dirt, further separating oil from said sludge by a liquid phase settling, and adding to the product so obtained a viscosity reducing fat compatible with the use to which the product is to be put.

6. In the art of obtaining soybean phosphatides from hot pressed soybean oil, the step of blowing said phosphatides with oxygen to remove odor therefrom.

7. In the art of obtaining soybean phosphatides from hot pressed soybean oil, the step of separating the oil containing the phosphatides into clear oil and sludge by settling at a temperature of substantially 55 to 70° C.

8. In the art of obtaining soybean phosphatides from hot pressed soybean oil, the step of centrifuging the phosphatides containing bean oil at a temperature of substantially 55 to 70° C., permitting said phosphatides to cool and solidify during said centrifuging, and removing additional oil by further centrifuging.

9. In the art of obtaining phosphatides from hot pressed bean oil suitable for use as lecithin substitutes, the steps of gravity separating the phosphatides from the bean oil, removing the bean oil from the separated phosphatide sludge, blowing the phosphatide sludge with air to remove odor, and finally centrifuging the phosphatide sludge while the same is maintained at a temperature from approximately 55 to approximately 70° C.

WELLS W. GINN.